US009424364B2

(12) United States Patent
Antebi et al.

(10) Patent No.: US 9,424,364 B2
(45) Date of Patent: Aug. 23, 2016

(54) INTEGRATED CONTEXT-DRIVEN INFORMATION SEARCH AND INTERACTION

(75) Inventors: Oudi Antebi, Los Altos Hills, CA (US); Amir Leshem, Rishon Lezyyon (IL); Roy Antebi, Ganey Tikva (IL); Ran Hanoch Meiteles, Tel Aviv (IL); Sagi Eliyahu, Tel Aviv (IL)

(73) Assignee: JIVE SOFTWARE, INC.

( * ) Notice: Subject to any disclaimer, the term of this patent is extended or adjusted under 35 U.S.C. 154(b) by 215 days.

(21) Appl. No.: 13/396,400

(22) Filed: Feb. 14, 2012

(65) Prior Publication Data

US 2013/0212496 A1 Aug. 15, 2013

(51) Int. Cl.
*G06F 17/30* (2006.01)
*G06F 3/01* (2006.01)

(52) U.S. Cl.
CPC ............................. *G06F 17/30893* (2013.01)

(58) Field of Classification Search
CPC ............ G06F 17/30899; G06F 17/30864; G06F 9/44526; G06F 17/30893
USPC .................................................. 715/760, 234
See application file for complete search history.

(56) References Cited

U.S. PATENT DOCUMENTS

| | | | | |
|---|---|---|---|---|
| 8,589,235 B2* | 11/2013 | Moxley | ............. | G06F 17/30861 705/14.73 |
| 2002/0128814 A1* | 9/2002 | Brandon | ............... | G06F 17/271 704/1 |
| 2004/0210536 A1* | 10/2004 | Gudelj | ................... | G06Q 20/10 705/64 |
| 2008/0109787 A1* | 5/2008 | Wang | ........................ | G06F 8/33 717/113 |
| 2008/0109808 A1* | 5/2008 | Wing | ................ | G06F 17/30011 718/102 |
| 2008/0155555 A1* | 6/2008 | Kwong | ..................... | G06F 8/20 719/315 |
| 2009/0234876 A1* | 9/2009 | Schigel | ............. | G06F 17/30873 |

(Continued)

FOREIGN PATENT DOCUMENTS

WO    WO 2011127653 A1 * 10/2011   ........ G06F 17/30864

OTHER PUBLICATIONS

AOL Mail Blog, Aug. 24, 2011, pp. 1-2 http://mailblog.aol.com/2011/08/24/sending-out-an-sms-from-your-inbox/.*

(Continued)

*Primary Examiner* — Scott Baderman
*Assistant Examiner* — Mario M Velez-Lopez
(74) *Attorney, Agent, or Firm* — Arjomand Law Group; Farjam Majd (57) ABSTRACT

A method and a device are disclosed including an integrated connection between a Social Business Network (SBN) and a webpage configured to provide context-based relevant information about content and/or metadata associated with the webpage. A SBN provides business-oriented information in a social networking environment. In some embodiments, SBN connection automatically provides information about the webpage's owner, or is used used or to start a conversation with another user. In still other embodiments, the SBN connection may retrieve information from external sources such as Facebook®, web, and databases associated with the SBN, including prior relevant conversations, project information, participant information, articles, historical data, and the like. In various embodiments, the SBN connection is in the form of a browser plugin component, which may be enhanced by custom software cartridges developed by customers of SBN to dynamically alter the behavior or add functionality to the SBN plugin component.

18 Claims, 8 Drawing Sheets

(56) References Cited

U.S. PATENT DOCUMENTS

| | | | |
|---|---|---|---|
| 2009/0313116 A1* | 12/2009 | Ashbaugh | G06F 17/211 705/14.47 |
| 2010/0023506 A1* | 1/2010 | Sahni | G06F 17/30876 707/E17.014 |
| 2010/0082695 A1* | 4/2010 | Hardt | G06F 17/30893 707/798 |
| 2010/0153832 A1* | 6/2010 | Markus | G06F 17/30424 715/205 |
| 2011/0029964 A1* | 2/2011 | Kobayashi | G06F 8/67 717/171 |
| 2011/0137884 A1* | 6/2011 | Anantharajan | G06F 17/30637 707/708 |
| 2012/0011432 A1* | 1/2012 | Strutton | G06Q 30/02 715/234 |
| 2012/0117049 A1* | 5/2012 | Zhou | G06F 17/30864 707/706 |
| 2012/0151310 A1* | 6/2012 | El-kalliny | G06F 17/30867 715/205 |
| 2012/0209713 A1* | 8/2012 | Plut | G06Q 30/02 705/14.55 |
| 2012/0296746 A1* | 11/2012 | Bleadall et al. | 705/14.66 |
| 2012/0331067 A1* | 12/2012 | Richter | G06Q 50/01 709/206 |
| 2013/0080321 A1* | 3/2013 | Mulhall | G06Q 30/06 705/41 |
| 2013/0304869 A1* | 11/2013 | Gupta | G06F 9/541 709/219 |

OTHER PUBLICATIONS

Better Web Browsing, Dec. 15, 2011, pp. 1-13 http://www.w3.org/WAI/users/browsing.html.*

Flve Best download manager, Dec. 11, 2011, pp. 1-3 http://lifehacker.com/5045093/five-best-download-managers.*

* cited by examiner

INTEGRATED CONTEXT-DRIVEN INFORMATION SEARCH AND INTERACTION

TECHNICAL FIELD

This application relates generally to integrated information environments. More specifically, this application relates to retrieval of context-based relevant information based on a social business networking data source by associating content, discussions, and social interactions with specific web pages and web applications.

BRIEF DESCRIPTION OF THE DRAWINGS

The drawings, when considered in connection with the following description, are presented for the purpose of facilitating an understanding of the subject matter sought to be protected.

DETAILED DESCRIPTION

While the present disclosure is described with reference to several illustrative embodiments described herein, it should be clear that the present disclosure should not be limited to such embodiments. Therefore, the description of the embodiments provided herein is illustrative of the present disclosure and should not limit the scope of the disclosure as claimed. In addition, while following description references particular environments such as an enterprise, it will be appreciated that the disclosure may be used in other environments such as wide area networks, the internet in general, and the like.

Briefly described, a device and a method are disclosed including an integrated connection between a Social Business Network (SBN) and a web page, the connection configured to provide context-based relevant information about the content and/or meta data associated with the web page to the user of the web page from data sources associated with and/or usable by the SBN. A social business network generally provides business-oriented information and content to users in a social networking environment. In some embodiments, SBN connection may be used to automatically provide information about the web page's owner, while in other embodiments, the SBN connection may be used to start a conversation with another user of the SBN from within the web page on a subject matter appearing in the web page or other subject matters. In still other embodiments, the SBN connection may be used to automatically and/or manually retrieve information from external or third party data sources such as other social networking sites like Facebook®, web, and databases associated with the SBN. Such information may include prior conversations related to a subject matter appearing on the web page, project information, participant information, articles, historical data, and the like. In various embodiments, the SBN connection is in the form of a browser plugin component, which may be enhanced by custom software cartridges developed by customers of SBN to dynamically alter the behavior or add functionality to the SBN plugin component.

With the ubiquity of computing devices such as laptop computers, computing pads and tablets, and powerful smartphones, among others, and widely available high speed computer networks, access to information is easier than ever. However, the hidden cost of this ease of access to information is the abundance of irrelevant information and the difficulty of finding useful information. Additionally, when people discuss a subject, their collaboration process and interaction often may be disconnected from the major sources of information about the topic discussed. For example, when two people discuss an article from a news source such as CNN (Cable News Network), they may do so using particular software applications, such as e-mail, SBN, and the like, but when they actually access the CNN web page their discussion and collaborative experience is not present on the CNN web page.

File, data, and application software may be stored on servers, such as Microsoft's SharePoint® server, and be made accessible to multiple users. However, as the amount of data, files, and directories quickly multiply over time, especially in an enterprise environment, finding useful and relevant information may become a time-consuming challenge. Therefore, providing accurate context-based information which is relevant to what the user is currently viewing or working on can be highly valuable. Also, enabling people to add content and/or collaborate in the context of a web page or web application they are viewing may be critical in some situations.

Illustrative Operating Environment

Figure 1:
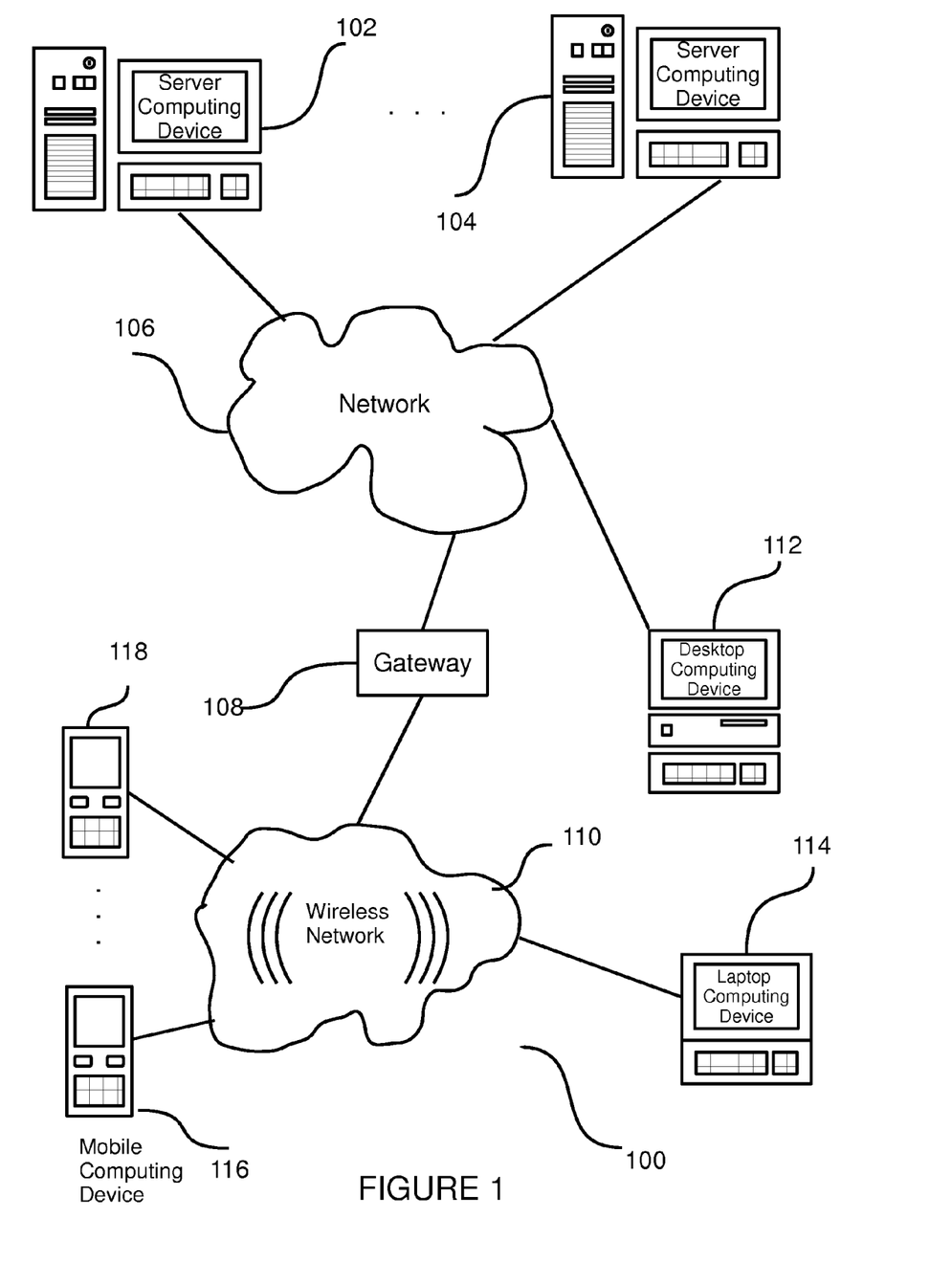
FIG. 1 shows an embodiment of a network computing environment wherein the disclosure may be practiced.

FIG. 1 shows components of an illustrative environment in which the disclosure may be practiced. Not all the shown components may be required to practice the disclosure, and variations in the arrangement and type of the components may be made without departing from the spirit or scope of the disclosure. System 100 may include Local Area Networks (LAN) and Wide Area Networks (WAN) shown collectively as Network 106, wireless network 110, gateway 108 configured to connect remote and/or different types of networks together, client computing devices 112-118, and server computing devices 102-104.

One embodiment of a computing device usable as one of client computing devices 112-118 is described in more detail below with respect to FIG. 2. Briefly, however, client computing devices 112-118 may include virtually any device capable of receiving and sending a message over a network, such as wireless network 110, or the like. Such devices include portable devices such as, cellular telephones, smart phones, display pagers, radio frequency (RF) devices, music players, digital cameras, infrared (IR) devices, Personal Digital Assistants (PDAs), handheld computers, laptop computers, wearable computers, tablet computers, integrated devices combining one or more of the preceding devices, or the like. Client device 112 may include virtually any computing device that typically connects using a wired communications medium such as personal computers, multiprocessor systems, microprocessor-based or programmable consumer electronics, network PCs, or the like. In one embodiment, one or more of client devices 112-118 may also be configured to operate over a wired and/or a wireless network.

Client devices 112-118 typically range widely in terms of capabilities and features. For example, a cell phone may have a numeric keypad and a few lines of monochrome LCD display on which only text may be displayed. In another example, a web-enabled client device may have a touch sensitive screen, a stylus, and several lines of color LCD display in which both text and graphic may be displayed.

A web-enabled client device may include a browser application that is configured to receive and to send web pages, web-based messages, or the like. The browser application may be configured to receive and display graphic, text, multimedia, or the like, employing virtually any web based language, including a wireless application protocol messages (WAP), or the like. In one embodiment, the browser application may be enabled to employ one or more of Handheld Device Markup Language (HDML), Wireless Markup Language (WML), WMLScript, JavaScript, Standard Generalized Markup Language (SMGL), HyperText Markup Language (HTML), eXtensible Markup Language (XML), or the like, to display and send information.

Client computing devices 12-118 also may include at least one other client application that is configured to receive content from another computing device, including, without limit, server computing devices 102-104. The client application may include a capability to provide and receive textual content, multimedia information, or the like. The client application may further provide information that identifies itself, including a type, capability, name, or the like. In one embodiment, client devices 112-118 may uniquely identify themselves through any of a variety of mechanisms, including a phone number, Mobile Identification Number (MIN), an electronic serial number (ESN), mobile device identifier, network address, such as IP (Internet Protocol) address, Media Access Control (MAC) layer identifier, or other identifier. The identifier may be provided in a message, or the like, sent to another computing device.

Client computing devices 112-118 may also be configured to communicate a message, such as through email, Short Message Service (SMS), Multimedia Message Service (MMS), instant messaging (IM), internet relay chat (IRC), Mardam-Bey's IRC (mIRC), Jabber, or the like, to another computing device. However, the present disclosure is not limited to these message protocols, and virtually any other message protocol may be employed.

Client devices 112-118 may further be configured to include a client application that enables the user to log into a user account that may be managed by another computing device. Such user account, for example, may be configured to enable the user to receive emails, send/receive IM messages, SMS messages, access selected web pages, download scripts, applications, or a variety of other content, or perform a variety of other actions over a network. However, managing of messages or otherwise accessing and/or downloading content, may also be performed without logging into the user account. Thus, a user of client devices 112-118 may employ any of a variety of client applications to access content, read web pages, receive/send messages, or the like. In one embodiment, for example, the user may employ a browser or other client application to access a web page hosted by a Web server implemented as server computing device 102. In one embodiment, messages received by client computing devices 112-118 may be saved in non-volatile memory, such as flash and/or PCM, across communication sessions and/or between power cycles of client computing devices 112-118.

Wireless network 110 may be configured to couple client devices 114-118 to network 106. Wireless network 110 may include any of a variety of wireless sub-networks that may further overlay stand-alone ad-hoc networks, and the like, to provide an infrastructure-oriented connection for client devices 114-118. Such sub-networks may include mesh networks, Wireless LAN (WLAN) networks, cellular networks, and the like. Wireless network 110 may further include an autonomous system of terminals, gateways, routers, and the like connected by wireless radio links, and the like. These connectors may be configured to move freely and randomly and organize themselves arbitrarily, such that the topology of wireless network 110 may change rapidly.

Wireless network 110 may further employ a plurality of access technologies including 2nd (2G), 3rd (3G), 4th (4G), and any future generation radio access technologoies for cellular systems, WLAN, Wireless Router (WR) mesh, and the like. Access technologies such as 2G, 3G, and future access networks may enable wide area coverage for mobile devices, such as client devices 114-118 with various degrees of mobility. For example, wireless network 110 may enable a radio connection through a radio network access such as Global System for Mobil communication (GSM), General Packet Radio Services (GPRS), Enhanced Data GSM Environment (EDGE), WEDGE, Bluetooth, High Speed Downlink Packet Access (HSDPA), Universal Mobile Telecommunications System (UMTS), Wi-Fi, Zigbee, Wideband Code Division Multiple Access (WCDMA), and the like. In essence, wireless network 110 may include virtually any wireless communication mechanism by which information may travel between client devices 102-104 and another computing device, network, and the like.

Network 106 is configured to couple one or more servers depicted in FIG. 1 as server computing devices 102-104 and their respective components with other computing devices, such as client device 112, and through wireless network 110 to client devices 114-118. Network 106 is enabled to employ any form of computer readable media for communicating information from one electronic device to another. Also, network 106 may include the Internet in addition to local area networks (LANs), wide area networks (WANs), direct connections, such as through a universal serial bus (USB) port, other forms of computer-readable media, or any combination thereof. On an interconnected set of LANs, including those based on differing architectures and protocols, a router acts as a link between LANs, enabling messages to be sent from one to another.

Communication links within LANs typically include twisted wire pair or coaxial cable, while communication links between networks may utilize analog telephone lines, full or fractional dedicated digital lines including T1, T2, T3, and T4, Integrated Services Digital Networks (ISDNs), Digital Subscriber Lines (DSLs), wireless links including satellite links, or other communications links known to those skilled in the art. Furthermore, remote computers and other related electronic devices could be remotely connected to either LANs or WANs via a modem and temporary telephone link. Network 106 may include any communication method by which information may travel between computing devices. Additionally, communication media typically may enable transmission of computer-readable instructions, data structures, program modules, or other types of content, virtually without limit. By way of example, communication media includes wired media such as twisted pair, coaxial cable, fiber optics, wave guides, and other wired media and wireless media such as acoustic, RF, infrared, and other wireless media.

Illustrative Computing Device Configuration

Figure 2:
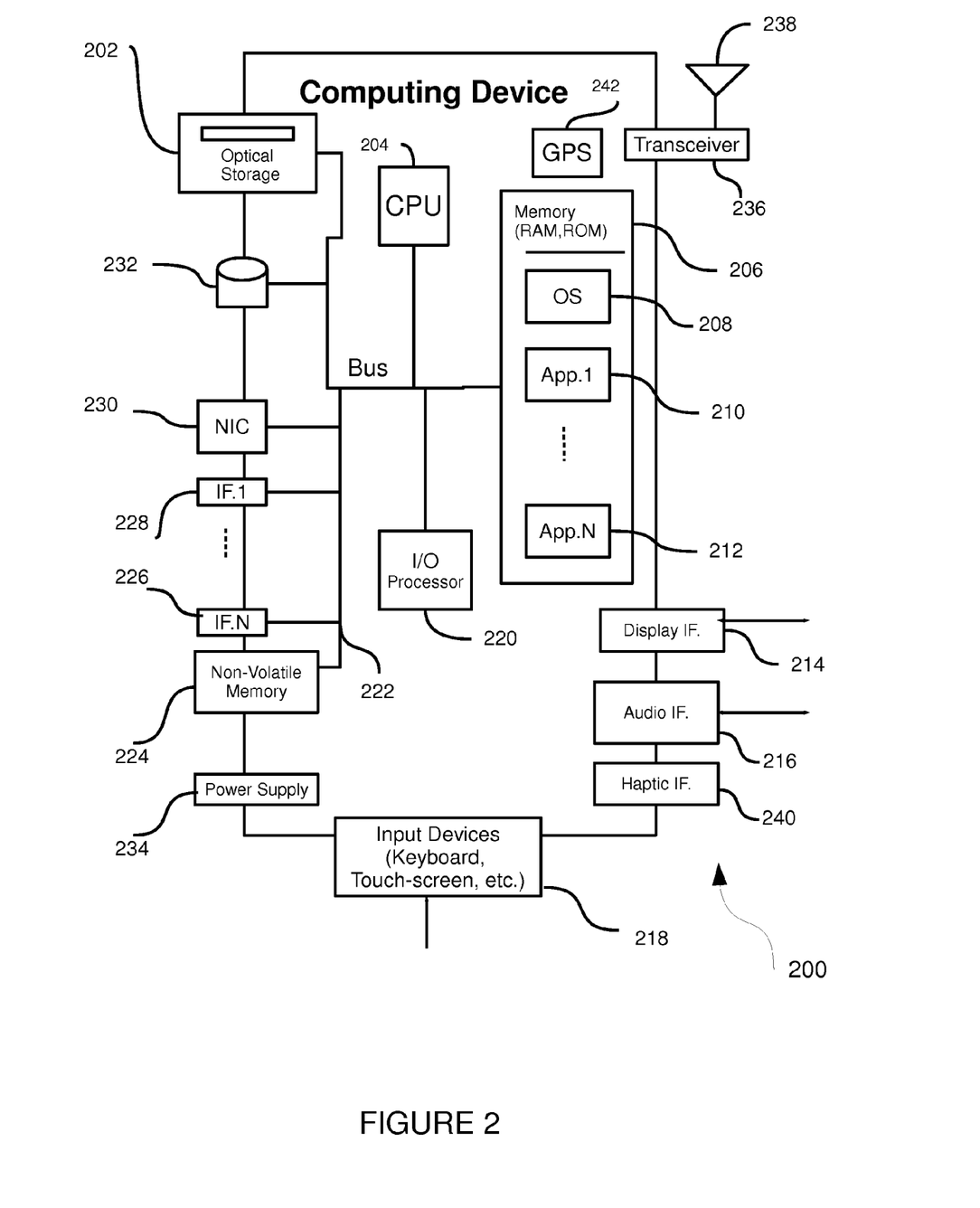
FIG. 2 shows an embodiment of a computing device that may be used in the network computing environment of FIG. 1.

FIG. 2 shows an illustrative computing device 200 that may represent any one of the server and/or client computing devices shown in FIG. 1. A computing device represented by computing device 200 may include less or more than all the components shown in FIG. 2 depending on the functionality needed. For example, a mobile computing device may include the transceiver 236 and antenna 238, while a server computing device 102 of FIG. 1 may not include these components. Those skilled in the art will appreciate that the scope of integration of components of computing device 200 may be different from what is shown. As such, some of the components of computing device 200 shown in FIG. 2 may be integrated together as one unit. For example, NIC 230 and transceiver 236 may be implemented as an integrated unit. Additionally, different functions of a single component may be separated and implemented across several components instead. For example, different functions of I/O processor 220 may be separated into two or more processing units.

With continued reference to FIG. 2, computing device 200 includes optical storage 202, Central Processing Unit (CPU) 204, memory module 206, display interface 214, audio interface 216, input devices 218, Input/Output (I/O) processor 220, bus 222, non-volatile memory 224, various other interfaces 226-228, Network Interface Card (NIC) 320, hard disk 232, power supply 234, transceiver 236, antenna 238, haptic interface 240, and Global Positioning System (GPS) unit 242. Memory module 206 may include software such as Operating System (OS) 208, and a variety of software application programs 210-212. Computing device 200 may also include other components not shown in FIG. 2. For example, computing device 200 may further include an illuminator (for example, a light), graphic interface, and portable storage media such as USB drives. Computing device 200 may also include other processing units, such as a math co-processor, graphics processor/accelerator, and a Digital Signal Processor (DSP).

Optical storage device 202 may include optical drives for using optical media, such as CD (Compact Disc), DVD (Digital Video Disc), and the like. Optical storage devices 202 may provide inexpensive ways for storing information for archival and/or distribution purposes.

Central Processing Unit (CPU) 204 may be the main processor for software program execution in computing device 200. CPU 204 may represent one or more processing units that obtain software instructions from memory module 206 and execute such instructions to carry out computations and/or transfer data between various sources and destinations of data, such as hard disk 232, I/O processor 220, display interface 214, input devices 218, non-volatile memory 224, and the like.

Memory module 206 may include RAM (Random Access Memory), ROM (Read Only Memory), and other storage means, mapped to one addressable memory space. Memory module 206 illustrates one of many types of computer storage media for storage of information such as computer readable instructions, data structures, program modules or other data. Memory module 206 may store a basic input/output system (BIOS) for controlling low-level operation of computing device 200. Memory module 206 may also store OS 208 for controlling the general operation of computing device 200. It will be appreciated that OS 208 may include a general-purpose operating system such as a version of UNIX, or LINUX™, or a specialized client communication operating system such as Windows Mobile™, or the Symbian® operating system. OS 208 may, in turn, include or interface with a Java virtual machine (JVM) module that enables control of hardware components and/or operating system operations via Java application programs.

Memory module 206 may further include one or more distinct areas (by address space and/or other means), which can be utilized by computing device 200 to store, among other things, applications and/or other data. For example, one area of memory module 206 may be set aside and employed to store information that describes various capabilities of computing device 200, a device identifier, and the like. Such identification information may then be provided to another device based on any of a variety of events, including being sent as part of a header during a communication, sent upon request, or the like. One common software application is a browser program that is generally used to send/receive information to/from a web server. In one embodiment, the browser application is enabled to employ Handheld Device Markup Language (HDML), Wireless Markup Language (WML), WMLScript, JavaScript, Standard Generalized Markup Language (SMGL), HyperText Markup Language (HTML), eXtensible Markup Language (XML), and the like, to display and send a message. However, any of a variety of other web based languages may also be employed. In one embodiment, using the browser application, a user may view an article or other content on a web page with one or more highlighted portions as target objects.

Display interface 214 may be coupled with a display unit (not shown), such as liquid crystal display (LCD), gas plasma, light emitting diode (LED), or any other type of display unit that may be used with computing device 200. Display units coupled with display interface 214 may also include a touch sensitive screen arranged to receive input from an object such as a stylus or a digit from a human hand. Display interface 214 may further include interface for other visual status indicators, such Light Emitting Diodes (LED), light arrays, and the like. Display interface 214 may include both hardware and software components. For example, display interface 214 may include a graphic accelerator for rendering graphic-intensive outputs on the display unit. In one embodiment, display interface 214 may include software and/or or firmware components that work in conjunction with CPU 204 to render graphic output on the display unit.

Audio interface 216 is arranged to produce and receive audio signals such as the sound of a human voice. For example, audio interface 216 may be coupled to a speaker and microphone (not shown) to enable communication with a human operator, such as spoken commands, and/or generate an audio acknowledgement for some action.

Input devices 218 may include a variety of device types arranged to receive input from a user, such as a keyboard, a keypad, a mouse, a touchpad, a touch-screen (described with respect to display interface 214), a multi-touch screen, a microphone for spoken command input (describe with respect to audio interface 216), and the like.

I/O processor 220 is generally employed to handle transactions and communications with peripheral devices such as mass storage, network, input devices, display, and the like, which couple computing device 200 with the external world. In small, low power computing devices, such as some mobile devices, functions of the I/O processor 220 may be integrated with CPU 204 to reduce hardware cost and complexity. In one embodiment, I/O processor 220 may the primary software interface with all other device and/or hardware interfaces, such as optical storage 202, hard disk 232, interfaces 226-228, display interface 214, audio interface 216, and input devices 218.

An electrical bus 222 internal to computing device 200 may be used to couple various other hardware components, such as CPU 204, memory module 206, I/O processor 220, and the like, to each other for transferring data, instructions, status, and other similar information.

Non-volatile memory 224 may include memory built into computing device 200, or portable storage medium, such as USB drives that may include PCM arrays, flash memory including NOR and NAND flash, pluggable hard drive, and the like. In one embodiment, portable storage medium may behave similarly to a disk drive. In another embodiment, portable storage medium may present an interface different than a disk drive, for example, a read-only interface used for loading/supplying data and/or software.

Various other interfaces 226-228 may include other electrical and/or optical interfaces for connecting to various hardware peripheral devices and networks, such as IEEE 1394 also known as FireWire, Universal Serial Bus (USB), Small Computer Serial Interface (SCSI), parallel printer interface, Universal Synchronous Asynchronous Receiver Transmitter (USART), Video Graphics Array (VGA), Super VGA (SVGA), and the like.

Network Interface Card (NIC) 230 may include circuitry for coupling computing device 200 to one or more networks, and is generally constructed for use with one or more communication protocols and technologies including, but not limited to, Global System for Mobile communication (GSM), code division multiple access (CDMA), time division multiple access (TDMA), user datagram protocol (UDP), transmission control protocol/Internet protocol (TCP/IP), SMS, general packet radio service (GPRS), WAP, ultra wide band (UWB), IEEE 802.16 Worldwide Interoperability for Microwave Access (WiMax), SIP/RTP, Bluetooth, Wi-Fi, Zigbee, UMTS, HSDPA, WCDMA, WEDGE, or any of a variety of other wired and/or wireless communication protocols.

Hard disk 232 is generally used as a mass storage device for computing device 200. In one embodiment, hard disk 232 may be a Ferro-magnetic stack of one or more disks forming a disk drive embedded in or coupled to computing device 200. In another embodiment, hard drive 232 may be implemented as a solid-state device configured to behave as a disk drive, such as a flash-based hard drive. In yet another embodiment, hard drive 232 may be a remote storage accessible over network interface 230 or another interface 226, but acting as a local hard drive. Those skilled in the art will appreciate that other technologies and configurations may be used to present a hard drive interface and functionality to computing device 200 without departing from the spirit of the present disclosure.

Power supply 234 provides power to computing device 200. A rechargeable or non-rechargeable battery may be used to provide power. The power may also be provided by an external power source, such as an AC adapter or a powered docking cradle that supplements and/or recharges a battery.

Transceiver 236 generally represents transmitter/receiver circuits for wired and/or wireless transmission and receipt of electronic data. Transceiver 236 may be a stand-alone module or be integrated with other modules, such as NIC 230. Transceiver 236 may be coupled with one or more antennas for wireless transmission of information.

Antenna 238 is generally used for wireless transmission of information, for example, in conjunction with transceiver 236, NIC 230, and/or GPS 242. Antenna 238 may represent one or more different antennas that may be coupled with different devices and tuned to different carrier frequencies configured to communicate using corresponding protocols and/or networks. Antenna 238 may be of various types, such as omni-directional, dipole, slot, helical, and the like.

Haptic interface 240 is configured to provide tactile feedback to a user of computing device 200. For example, the haptic interface may be employed to vibrate computing device 200, or an input device coupled to computing device 200, such as a game controller, in a particular way when an event occurs, such as hitting an object with a car in a video game.

Global Positioning System (GPS) unit 242 can determine the physical coordinates of computing device 200 on the surface of the Earth, which typically outputs a location as latitude and longitude values. GPS unit 242 can also employ other geo-positioning mechanisms, including, but not limited to, triangulation, assisted GPS (AGPS), E-OTD, CI, SAI, ETA, BSS or the like, to further determine the physical location of computing device 200 on the surface of the Earth. It is understood that under different conditions, GPS unit 242 can determine a physical location within millimeters for computing device 200. In other cases, the determined physical location may be less precise, such as within a meter or significantly greater distances. In one embodiment, however, a mobile device represented by computing device 200 may, through other components, provide other information that may be employed to determine a physical location of the device, including for example, a MAC address.

Figure 3:
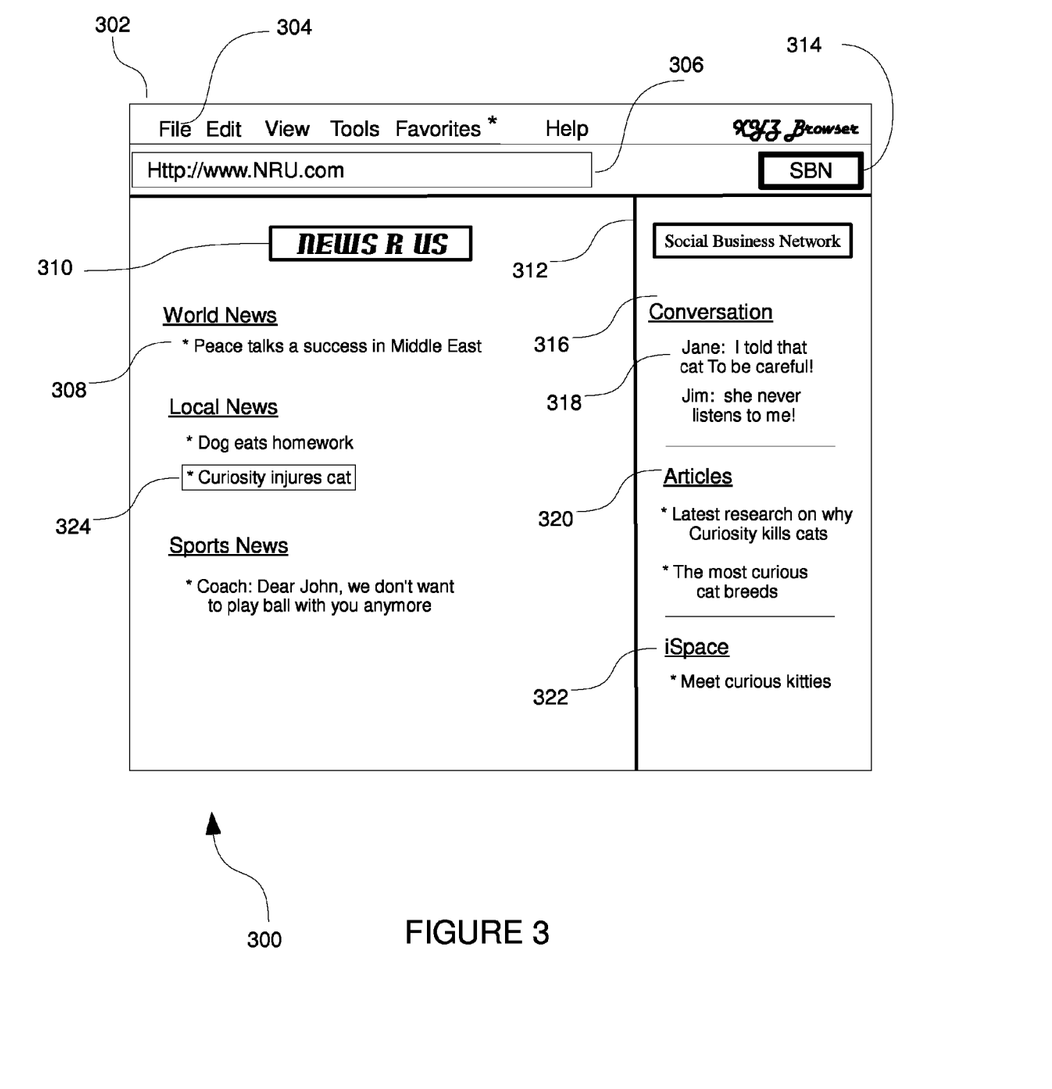
FIG. 3 shows an example web page which provides context-based information from an integrated social business network data source usable with the computing device of FIG. 2.

FIG. 3 shows an example web page which provides context-based information from an integrated social business network data source usable with the computing device of FIG. 2. In various embodiments, webpage 300 appears in browser window 302 typically having some menu items 304, a URL field 306, a page title 310, content 308, and selected content 324. Web page 300 may also include a separate supplemental information pane 312 associated with a Social Business Network (SBN) which is integrated with the webpage and configured to display other sections and/or categories of information such as conversation section 316, article section 320, and other social networking sections 322. Each section may have its own supplemental content 318. Integrated SBN button 314 may be provided, for example using an integration software module such as a software plug-in, configured to provide a data connection between the webpage and the SBN, and further configured to be used by a user of the web page to search and fetch relevant information based on various criteria. In other embodiments, SBN button 314 may be embedded into the source code of a web page by the web page creator or owner, as further described below.

In various embodiments, a plug-in component may appear as a button, a toolbar, a new menu, or other common user interface components integrated with the web page. Those skilled in the art will appreciate that the plug-in component may be implemented as one or more modules, each module providing different functionalities for the plug-in component. Those skilled in the relevant arts will appreciate that plug-in or add-in components are generally software components that run within another host program to add various capabilities, such as playing video clip players, encrypting content, messaging, and the like, within the host application originally lacking such capabilities. Plug-in components are useful at least because they may be deployed by third parties onto existing host applications after the release of such applications by their manufacturers. Plug-ins are usually installed by users after installation of the host application. A host application may generally provide a service interface (or API—Application Programming Interface) for use by plug-in components to register themselves and exchange data with the host application. Plug-ins may be implemented using DLLs (Dynamic Link Library) which are components that may be dynamically added to a running program and provide various callable functions and capabilities.

In various embodiments, the plug-in component generally provides capabilities which do not exist in the host program. For example, image and text search functions may not be available in the host applications, but are added by the plug-in. Those skilled in the art will appreciate that plug-ins are not limited to use in web pages and may be used in standalone applications, such as document processing applications, to add after-release or post-compilation functionality to the host software.

In some embodiments, a user of the web page may install integrated SBN functionality in his browser to allow automatic or manually initiated automatic search for and presentation of relevant information about the content of the web page and/or about the web page itself. In these embodiments, the integrated SBN functionality is available only on the client computing device of the user. In other embodiments, the SBN integrated functionality may be built in to the web server, for example, using a scripting language such as JavaScript, and be available to all users of the web pages served by the web server.

In various embodiments, activating SBN functionality, for example, by selecting SBN button 314, an additional pane 312 is opened by the integration software module in the same web page, while in other embodiments, a new SBN window may be opened which is related to the current web page. In other embodiments, the user may select how he wants the SBN information to be presented by setting appropriate options on the browser and/or plug-in interface.

In operation, in various embodiments, the users opens a webpage to browse information on a particular web site. Depending on user settings and/or integrated SBN configuration, an integrated SBN interface is presented to the user. In some embodiments, this integrated SBN interface may have the form of a pane 312 within current webpage 300, or may take the form of a separate window. In some embodiments, the integrated SBN interface may take a form of a scrolling information ribbon in some area of the computer screen, such as the bottom edge. Those skilled in the art will appreciate that many other user interfaces are possible without departing from the spirit of the present disclosures. Regardless of the SBN user interface, the integrated SBN interface is related to and/or aware of the current webpage via data and/or metadata associated with the current webpage.

In some embodiments, the user may select content 324 of the current web page, which may include text, images, links, icons, or other content, and then click on SBN button 314 to launch an automatic search for information by the integrated SBN from various sources such as SBN databases, the Web, social networking sites like Facebook® and Linkedin®, and any other computer-accessible sources of data available. In some embodiments, activating SBN button 314 may result in using other methods, instead of or in addition to search, to retrieve relevant information about current content 324, such as fetching pre-associated information, for example, by using an index to an existing database table, without performing a search. In other embodiments, hovering the cursor over content triggers search and fetch of relevant information by the integrated SBN for simultaneous display to the user.

In various embodiments, the integrated SBN the relevant information includes saved conversations or discussions between the user and other users or between other users from the SBN databases and/or platforms. For example, selecting content 324 on the current web page may trigger SBN to search and display a conversation supplemental content 318 on a related subject in the supplemental information pane 312. Similarly, SBN may search other social networking sites and the web to present articles in articles section 320 and social networking content in social networking section 322.

The search results provided by the integrated SBN may include text and images. For example, a search based on a selected content "cat" may return results that typically include textual data and some images of cats. In various embodiments, the search function of the integrated SBN component searches the web for images using commercial search engines, such as Google® and Yahoo®. Search engine API may be used to filter search results according to intellectual property rights, such as copyright and trademark. As such, the SBN search functionality makes it unnecessary for the user to perform a separate search to obtain supplemental information.

In various embodiments, the user may go through a setup process to specify the type, format, and scope of searches to be performed. For example, a user may specify the search to cover social network sites only, SBN database only, text only, images only, conversations only, and the like or any combination thereof. In some embodiments, the user may also select advanced search options in the setup process to view additional search parameters and settings to be used as criteria to further restrict the search. For example, in the advanced search settings, the user may include or exclude a date range, a particular source, image size, image format, and the like.

In some embodiments, metadata may be used by the integrated SBN to search, sort, group, categorize or otherwise organize search results for presentation to the user via pane 312. The metadata may be obtained from various sources such as the webpage source code, third party databases associated with the web page owner, and the like. Secondary metadata may also be obtained from a preliminary search on the search subject. For example, if the search subject is a person, a preliminary search may be performed to find information on the person and then use any metadata associated with the found information to further search other sources for additional information.

Figure 4:
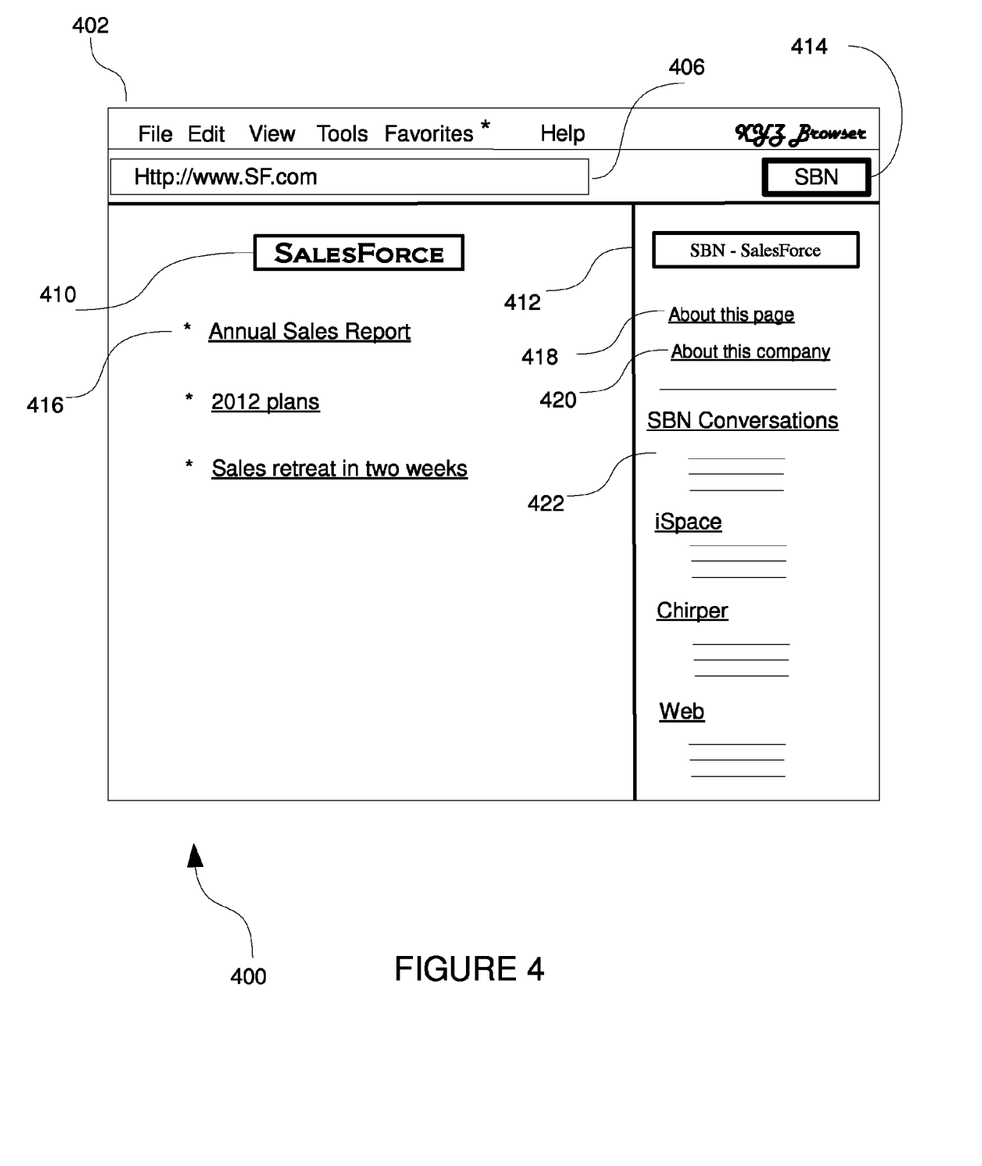
FIG. 4 shows an example web page which provides automatically searched and retrieved information about a web page or the web page's host from an integrated social business network data source.

FIG. 4 shows an example web page which provides automatically searched and retrieved information about a web page or the web page's host from an integrated social business network data source. In various embodiments, web page 400 is displayed in browser window 402 having a URL field 406, an SBN button 414, web page title 410, web page content 416, and supplemental information pane 412. Supplemental information pane 412 may include special custom search links 418 and 420 and supplemental content sections 422.

An organization, such as a company, may be associated with the SBN. For example, the company may be a customer or subscriber of the SBN. In various embodiments, the company webpage may have a custom integrated SBN component providing custom search and/or information capabilities specific to the company. The integrated SBN interface, for example, supplemental information pane 412, may include multiple custom search buttons or links 418 and 420 operable to find and present supplemental information tailored to the needs or specifications of the company. In some embodiments, selecting one of the custom search links 418 or 420 focuses the search on the type of supplemental information indicated by the link. For example, if link 420 is selected for company related information, then the supplemental information found and presented will be most relevant to the company, as opposed to other content on the web page. The supplemental information about the company may be presented in the supplemental content section 422 and include prior idea exchanges and conversations saved on SBN databases, social networking posts regarding the company, blogs, and web news, among others.

Similarly, if link 418 is selected for the particular webpage, the supplemental information found and presented will be most relevant to the general subject or contents of the webpage. The general subject of the webpage may include a project or product by the owner (for example, a company) of the webpage, a technology employed by the owner in its products, services offered by the owner, and the like. The contents of the webpage may include particular news, blogs about a related industry, white papers, founders' biographical information, and the like. The supplemental information about the webpage may be presented in the supplemental content section 422 and include prior idea exchanges and conversations saved on SBN databases, social networking posts regarding the company, blogs, and web news, among others.

Those skilled in the art will appreciate that many other types of custom links may be configured for the integrated SBN in a webpage or website without departing from the spirit of the present disclosures. For example, a "Competition" custom search link may be used to search and present information from various external and/or SBN sources related to the competitors of a company owner of the web page.

Figure 5A:
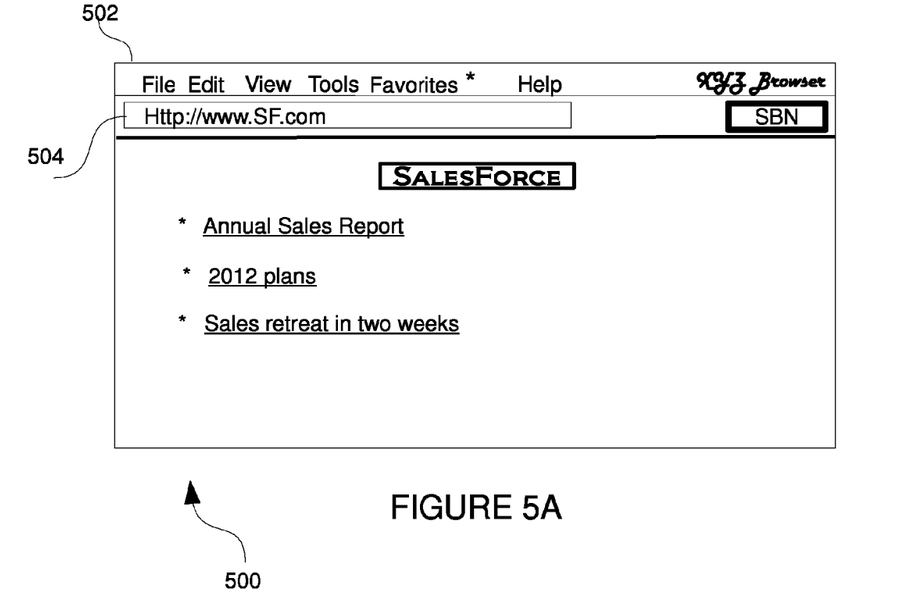
FIG. 5A shows an example web page with a URL lacking full identification of the page's owner.

FIG. 5A shows an example web page with a URL lacking full identification of the page's owner. In some embodiments, webpage 500 appears in browser 502 including URL field 504. Given the general desirability of short web URLs for ease of remembering and entering into the URL field by users and/or customers of a webpage, and the fact that some company or organization names are long, many websites use an abbreviation, such as the initials, of their full names. For example, a company named "Sales Force" may use "SF" as the main URL for its website, because it is easier to remember "SF" and type it in a browser address field (URL field) than the complete name to download the webpage. However, such abbreviations may create a problem for automatic search of information related to the company with the full name. So, for example, if SF webpage uses an integrated SBN component, the "Company" custom search link 420 (see FIG. 4) may not be able to retrieve all the possible relevant information about the company using the abbreviation "SF" compared to the full name "Sales Force." As such, a method of obtaining the full company name based on the abbreviation in the URL may be employed using the source code of the web page, as further described below with respect to FIG. 5B.

Figure 5B:
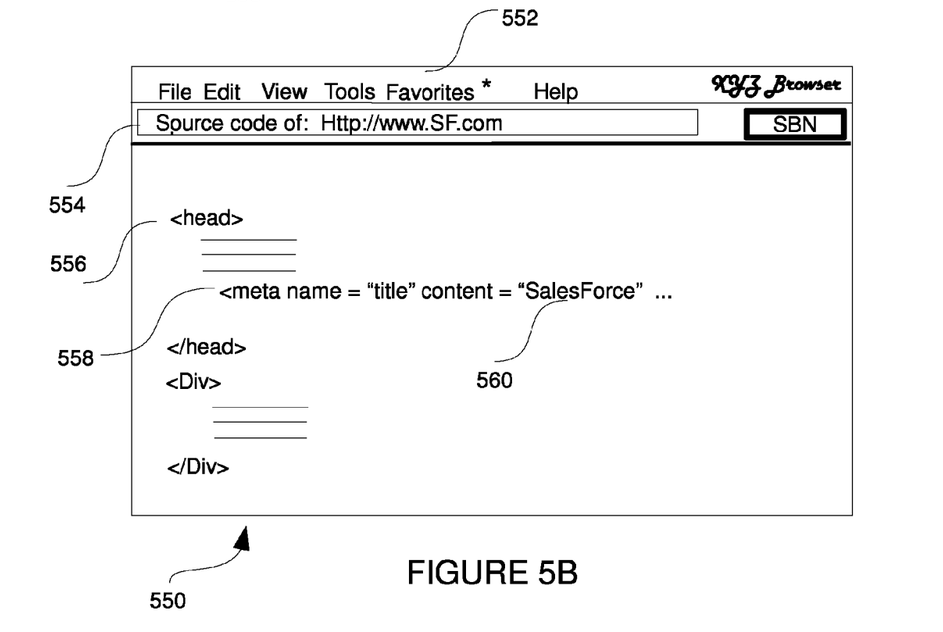
FIG. 5B shows an example source code of the web page of FIG. 5A having the full identification of the page's owner.

FIG. 5B shows an example source code of the web page of FIG. 5A having the full identification of the page's owner. In various embodiments, webpage 550 is presented in browser 552 including URL field 554, source code 556, script tags 558, and embedded metadata 560.

In some embodiments, the URL in URL field 554 may be used to search source code 556 of webpage 550 to find various metadata not explicitly visible on the webpage. For example, the full company name "Sales Force" may be found embedded in a script tag within the source code. The full company name may then be used to search for and present information relevant to the company.

Figure 6:
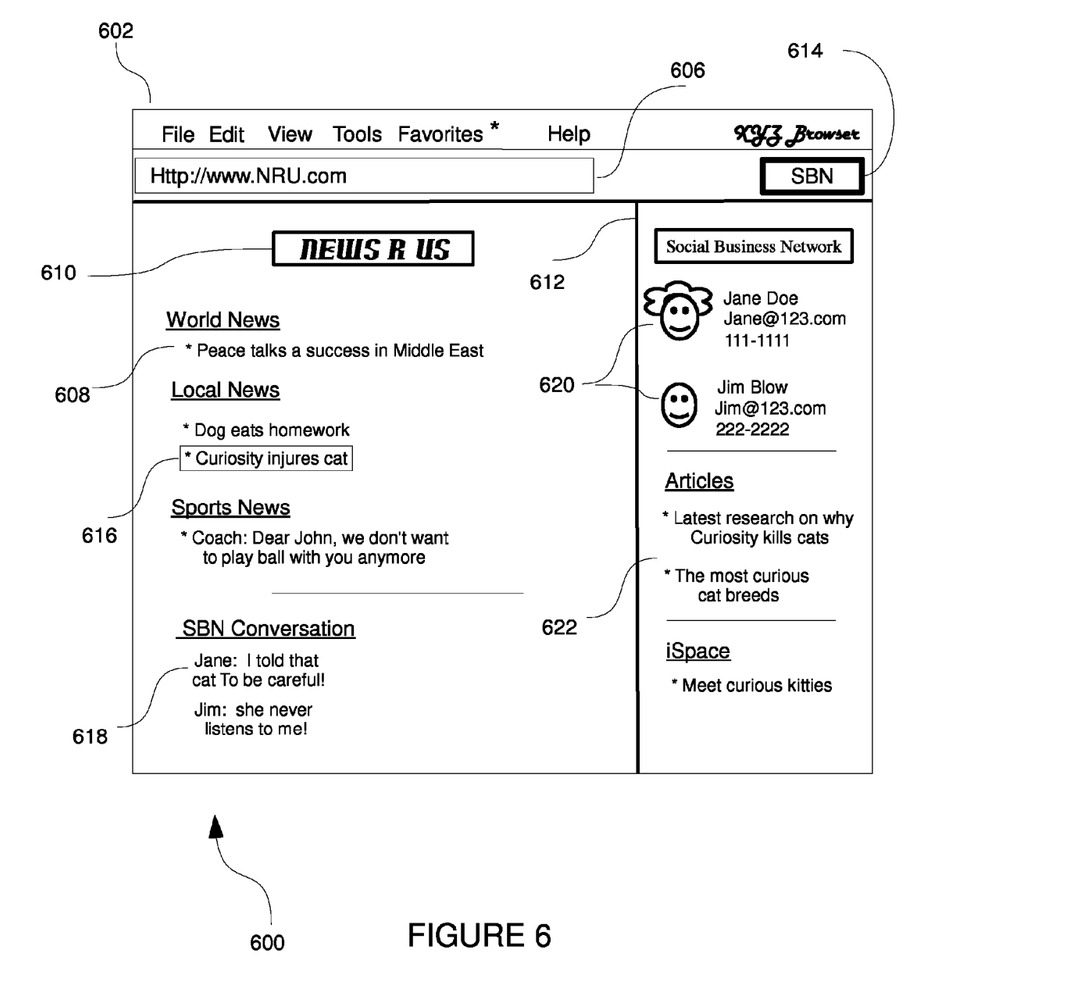
FIG. 6 shows an example web page having an integrated social business network pane and which allows start of an integrated conversation on the social business network.

FIG. 6 shows an example web page having an integrated social business network pane and which allows start of an integrated conversation on the social business network. In various embodiments, webpage 600 is presented in browser 602 having URL field 606, webpage content 608, webpage title 610, supplemental information pane 612, integrated SBN button 614 including user profiles 620 and supplemental information 622, selected content 616, and integrated conversation 618.

In various embodiments, a user viewing webpage 600 may be interested in exchanging views and ideas with another user about selected content 616. The user may start a written conversation with the other user without leaving the webpage or using another application program such as email or IM. In some embodiments, the user may select the content, click on SBN button 614 and be presented with a dialog box from which the user may select the other user to request commencement of the conversation. Conversation 618 may then take place in substantially real-time on the same webpage providing full context of the conversation. In some embodiments, once the other user is notified of the request, a copy of the same webpage 600 is opened for the other user to allow the conversation to take place in the same context for both users. A record of the conversation may be stored by the integrated SBN for future reference and use. Supplemental information 622 may also be automatically presented to the users to enrich and further inform their conversation.

Those skilled in the art will appreciate that many other arrangements may be utilized to allow an in-context integrated conversation as described above between users without departing from the spirit of the present disclosure. For example, a separate dialog window may be opened to carry out the written conversation while still displaying the same webpage and recording the conversation. In another embodiment, an audio-visual or multi-media exchange may be arranged between the users, hosted in the webpage or in a separate window while still integrated and having shared data with the SBN and/or the webpage. In some embodiments, a speech recognition module may convert the spoken conversation to written text for easy transmission and use in documents and/or future searches.

Figure 7:
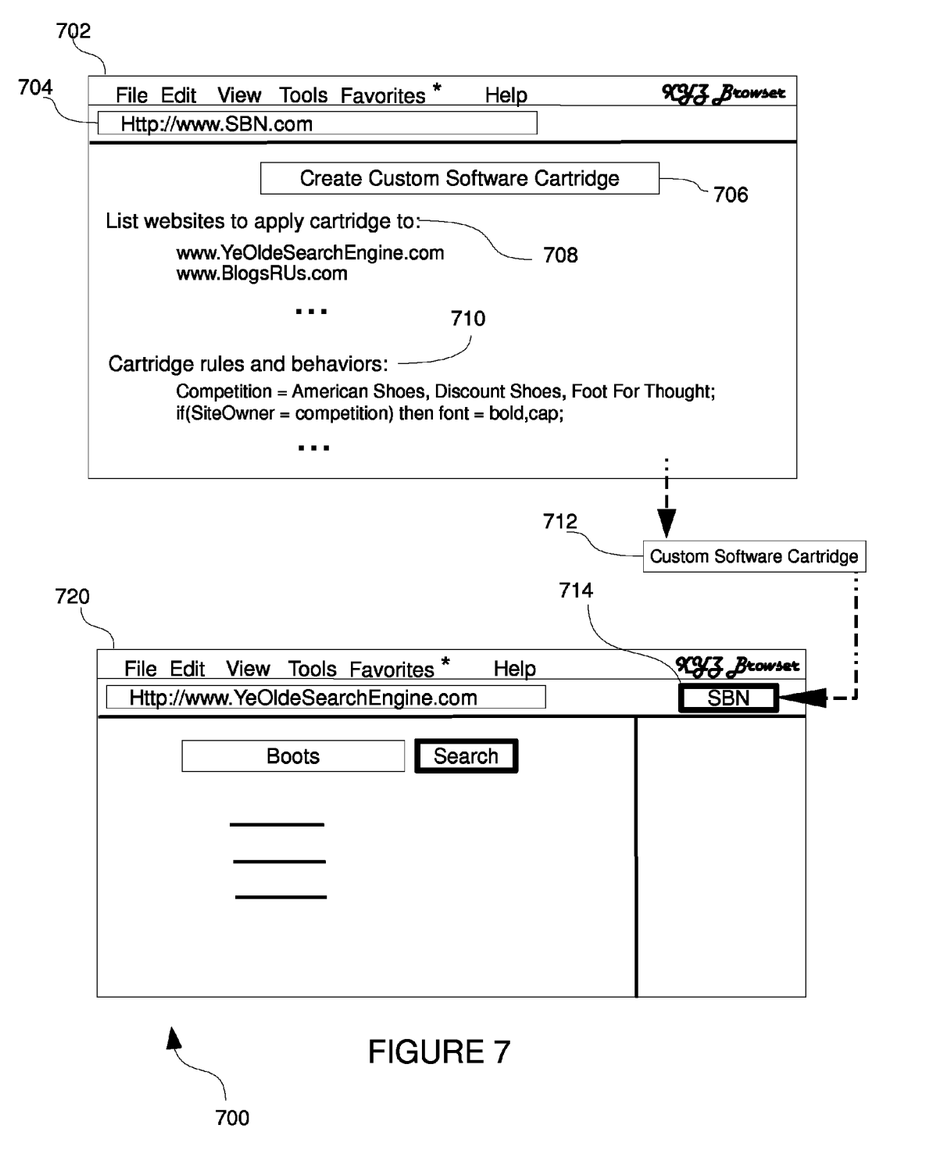
FIG. 7 shows an example Social Business Network (SBN) web page for the creation of a custom software cartridge for use with a SBN plugin component on other target web pages.

FIG. 7 shows an example Social Business Network (SBN) web page for the creation of a custom software cartridge for use with a SBN plugin component on other target web pages. In various embodiments, in web environment 700, web site 702 owned by a SBN organization may be used to create custom software cartridge 712 which may then be associated with a software plugin component 714 (described above with respect to FIG. 3) used in target web page 720. SBN web site 702 with URL 704 may include many web pages, one of which is custom software cartridge creation webpage 706, providing an input opportunity for a user and/or subscriber of the SBN site to list the URLs of target web pages, such as target web page 720, to which the custom software cartridge may be applied. Webpage 706 may additionally provide an cartridge definition interface 710 for defining or specifying functional aspects and behavioral rules for the custom software cartridge.

Custom software cartridge is associated with an existing plugin component on a target webpage to modify the behavior of the plugin in particular ways according to the behaviors and rules embedded in the custom software cartridge. For example, a cartridge may be defined to change the color or other attributes (such as font) of text associated with a particular area, such as a side pane, of the browser window in which the text is displayed. As such, the custom software cartridge may be viewed as a dynamic behavior supplement or modifier to the existing plugin on the target webpage. That is, the custom software cartridge may be provided by a party different from the developer of the plugin component and may be applied, withdrawn, or changed dynamically after the deployment and installation of the plugin component, thus providing a mechanism for altering the behavior of the plugin component without having to redesign and redeploy the plugin component.

The supplemental behavior provided by the custom software cartridge is not limited to changes to text, and may include any functionality which can be implemented by a client-side script. In various embodiments, such functionality may include communicating with a server-side script, downloading files, presenting a user interface on the target webpage, accessing a database, acquiring user input, playing multimedia files, and the like.

In operation, in various embodiments, the user of SBN site uses cartridge creation webpage 706 to define the behavior of custom software cartridge 712 and specify the list of websites to which the cartridge is applied. Those skilled in the art will appreciate that many different user interfaces may be used for defining the behavior of custom software cartridge 712. For example, a scripting language may be entered by user to fully define how the cartridge will behave once associated with a plugin component on a target webpage. In other embodiments, the user may select one of multiple predefined cartridges to add certain desired behavior to the plugin. While in other various embodiments, the user may be presented with an interface which helps the user define the cartridge behavior requirements and/or logic he wants in a simplified manner and a backend script translates the user's requirements and logic into a working script embedded in the cartridge.

In still other various embodiments, the custom software cartridge may dynamically download and/or associate other custom cartridges to perform other predefined functions when associated with the plugin component. For example, the user may associate a first custom software cartridge with a plugin component to perform play find and play a video on a selected keyword. The first custom software cartridge may then employ the services of two other custom software cartridges, one to search for the keyword and find a related video, and another one to download an browser-hosted media player to play the video, while the first custom software manages the overall high-level process.

Once the custom software cartridge has been defined and the list of target web sites or web pages to which the cartridge will be applied has been specified, the same or a different user may use a local machine, a client device, to visit one of the target websites/webpages. In various embodiments, the existing SBN plugin component (for example, SBN button 314 of FIG. 3) may capture the domain name of the hosting website and communicate the name with the SBN website to determine whether a custom cartridge is available for the target webpage. In various embodiments, the applicable custom software cartridges for a particular target website are determined based on a combination of an ID of the plugin component and the domain name of the target website. This way, the same target website may be visited by two different users, each user having a different plugin component on his local machine, and provide a different experiences for each of the two users due to the use of different cartridges. This arrangement may be advantageous because it allows two different subscribers (for example, two different companies) to the SBN organization to define different custom cartridges for the same target website, thus providing a different custom experience for their respective users when visiting the same target website.

In some embodiments, a standard directory, URL, or similar location specification is used to store the custom software cartridges. The standard storage location for the custom software cartridges is searched to find any cartridges applicable to a particular website in response to a plugin component inquiry from the particular website. If such cartridge is found, the rules or behaviors defined thereby are applied, for example, by downloading a client-side script segment, to the user's local/client machine to be applied to the target website on the local machine. Therefore, the user's experience in visiting a target website is customized only on the user's local machine. Other users visiting the same target website may have a different experience depending on the plugin component and the cartridges applied to their local machines.

Figure 8:
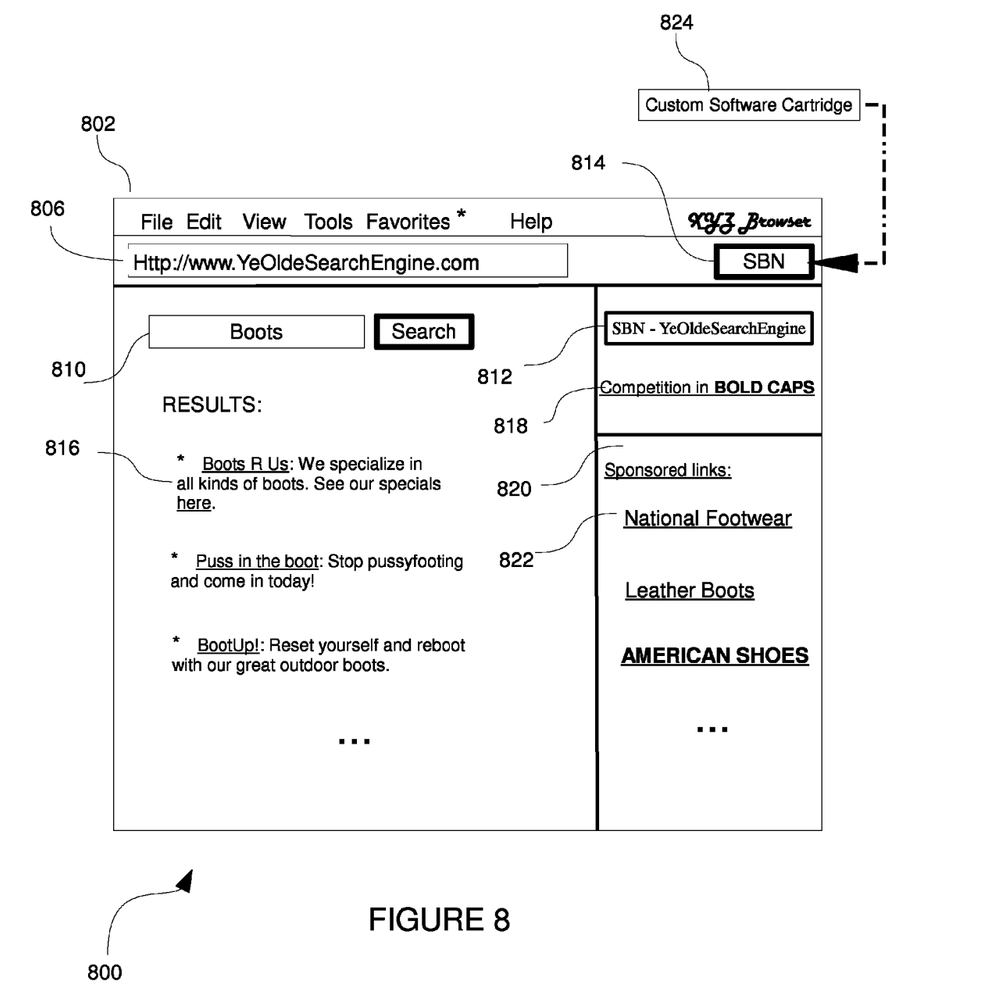
FIG. 8 shows an example target web page using the custom software cartridge of FIG. 7.

FIG. 8 shows an example target web page using the custom software cartridge of FIG. 7. In various embodiments, in web environment 800, browser 802 showing a website at URL 806 having SBN plugin 814 may include various content such as search input field 810, search results 816, SBN pane 812 specific to the host website at URL 806 having active link 818 to activate a selected function provided by custom software cartridge 824 to the plugin component. Display section 820 may show sponsored links 822 related to search results 816.

In various embodiments, a user, associated with an organization which created custom software cartridge 824, visiting the target website at URL 806 may use particular functions provided by the custom cartridge to enhance his experience, perform tasks, and/or access information not readily available on the target website. For example, a user who works at a shoe manufacturing company may use a public search website, such as Google, to find out what their competitors are doing. A custom software cartridge may be designed by the shoe manufacturing company to highlight their main competitors' names, for example, by making text bold or appear in all capitals, in the search results or in the sponsored links area. This way the user can easily spot links related to their competitors. Other software cartridges may be designed to offer different functions at different times for the same website, allowing dynamic selection of various behaviors by users without altering the plugin components or the target websites.

Using custom software cartridges allows some control of the plugin components' behaviors by third parties distinct from the developers of the plugin components, providing more customization opportunities for subscribers or customers of SBN services.

Changes can be made to the claimed invention in light of the above Detailed Description. While the above description details certain embodiments of the invention and describes the best mode contemplated, no matter how detailed the above appears in text, the claimed invention can be practiced in many ways. Details of the system may vary considerably in its implementation details, while still being encompassed by the claimed invention disclosed herein.

Particular terminology used when describing certain features or aspects of the disclosure should not be taken to imply that the terminology is being redefined herein to be restricted to any specific characteristics, features, or aspects of the disclosure with which that terminology is associated. In general, the terms used in the following claims should not be construed to limit the claimed invention to the specific embodiments disclosed in the specification, unless the above Detailed Description section explicitly defines such terms. Accordingly, the actual scope of the claimed invention encompasses not only the disclosed embodiments, but also all equivalent ways of practicing or implementing the claimed invention.

The above specification, examples, and data provide a complete description of the manufacture and use of the claimed invention. Since many embodiments of the claimed invention can be made without departing from the spirit and scope of the disclosure, the invention resides in the claims hereinafter appended. It is further understood that this disclosure is not limited to the disclosed embodiments, but is intended to cover various arrangements included within the spirit and scope of the broadest interpretation so as to encompass all such modifications and equivalent arrangements.

What is claimed is:

1. A non-transitory computer-readable medium having an integration software module stored thereon that when executed on a processor is configured to cause the processor to:
provide an integrated data connection between a webpage and a social network, the integration software module further configured to cause an automatic search for data relevant to a portion of content of the webpage selected by a user, wherein the integration software module behaves at least in part according to a third-party custom software cartridge that modifies a behavior of the integration software module to take actions in addition to search, including at least two of changing search results font, downloading files, presenting a user interface on a target webpage, accessing a database, acquiring user input, and playing multimedia files; and
a display area integrated with the webpage and configured by the integration software module to display search results generated by the integration software module.

2. The non-transitory computer-readable medium of claim 1, further comprising a user interface component associated with a content of the webpage, wherein the user interface component, when selected, causes information associated with the webpage to be displayed.

3. The non-transitory computer-readable medium of claim 1, wherein the integration software module is a browser plugin component.

4. The non-transitory computer-readable medium of claim 1, wherein the social network is configured to perform the search caused by the integration software module.

5. The non-transitory computer-readable medium of claim 1, wherein the data relevant to the webpage includes a prior communication between users of the social network.

6. The non-transitory computer-readable medium of claim 1, wherein the integration software module is built into the webpage.

7. A non-transitory computer-readable medium having an integration software module stored thereon and configured for communication that when executed on a processor causes the processor to:
use an integration software module to provide an integrated data connection between a webpage and a social network, the integrated data connection configured to automatically deliver data relevant to the webpage based on a portion of content of the webpage selected by a user, wherein the integration software module behaves at least in part according to a third-party custom software cartridge that modifies a behavior of the integration software module to take actions in addition to search, including at least two of changing search results font, downloading files, presenting a user interface on a target webpage, accessing a database, acquiring user input, and playing multimedia files; and
display the delivered data on the webpage.

8. The non-transitory computer-readable medium of claim 7, that when executed on the processor further causes the processor to establish a communication path between two users based on a selection of a content of the webpage.

9. The non-transitory computer-readable medium of claim 7, wherein the integration software module is a browser plugin component.

10. The non-transitory computer-readable medium of claim 7, wherein the delivered data is obtained from one or more of a database associated with the social network, an external social network, and other websites.

11. The non-transitory computer-readable medium of claim 7, wherein the software integration module is activated by selecting a user interface component associated with the software integration on the webpage.

12. A method of communication comprising:
employing an integration software module to provide an integrated data connection between a webpage and a social network, the integrated data connection configured to automatically deliver data relevant to the webpage based on a portion of content of the webpage selected by a user, wherein the integration software module behaves at least in part according to a third-party custom software cartridge that modifies a behavior of the integration software module to take actions in addition to search, including at least two of changing search results font, downloading files, presenting a user interface on a target webpage, accessing a database, acquiring user input, and playing multimedia files; and
establishing a communication path between a first user and second user by using the webpage based on a request from the first user viewing the webpage, wherein the second user is not associated with the webpage.

13. The method of communication of claim 12, further comprising providing a user interface component that when selected by a user causes a launch of a software integration module configured to establish the integrated data connection.

14. The method of communication of claim 13, wherein the software integration module comprises a browser plugin component.

15. The method of communication of claim 13, wherein the software integration module is built into the webpage.

16. The method of communication of claim 12, further comprising providing a user interface component that when selected causes delivery of data associated with the user interface component.

17. The method of communication of claim 12, wherein establishing a communication path between two users comprises opening a dialog area on the webpage.

18. The method of communication of claim 12, wherein establishing a communication path between two users by using the webpage comprises establishing a communication path based on a selected content on the webpage.

* * * * *